(12) United States Patent
Ratasuk et al.

(10) Patent No.: US 12,542,627 B2
(45) Date of Patent: Feb. 3, 2026

(54) METHOD FOR FAST SCHEDULING OF RETRANSMISSION

(71) Applicant: Nokia Technologies Oy, Espoo (FI)

(72) Inventors: Rapeepat Ratasuk, Iverness, IL (US); Srinivasan Selvaganapathy, Bangalore (IN); Muhammad Majid Butt, Palaiseau (FR); Nitin Mangalvedhe, Naperville, IL (US); David Bhatoolaul, Swindon Wiltshire (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 356 days.

(21) Appl. No.: 18/031,372

(22) PCT Filed: Sep. 15, 2021

(86) PCT No.: PCT/EP2021/075323
§ 371 (c)(1),
(2) Date: Apr. 12, 2023

(87) PCT Pub. No.: WO2022/078695
PCT Pub. Date: Apr. 21, 2022

(65) Prior Publication Data
US 2023/0379088 A1 Nov. 23, 2023

(30) Foreign Application Priority Data
Oct. 12, 2020 (IN) .............................. 202041044276

(51) Int. Cl.
*H04W 72/20* (2023.01)
*H04L 1/1812* (2023.01)
(Continued)

(52) U.S. Cl.
CPC .......... *H04L 1/1819* (2013.01); *H04L 1/1861* (2013.01); *H04L 1/1896* (2013.01);
(Continued)

(58) Field of Classification Search
CPC ............. H04W 72/23; H04W 72/0453; H04W 72/0446; H04W 72/20; H04W 48/12;
(Continued)

(56) References Cited

U.S. PATENT DOCUMENTS

2018/0279327 A1* 9/2018 Ying ................. H04W 72/0446
2020/0100126 A1* 3/2020 Salah .................... H04L 5/0094
(Continued)

*Primary Examiner* — Yee F Lam
(74) *Attorney, Agent, or Firm* — Carter, DeLuca & Farrell LLP

(57) ABSTRACT

A UE may be enabled to provide low latency, high reliability, and power savings. If a message of the UE is delay-sensitive, the UE may indicate to a gNB that fast retransmission scheduling may be necessary if a packet is not received over PUSCH. After transmitting the packet, the UE may monitor PDCCH for an indication that retransmission is required. This monitoring may occur sooner than a PDCCH monitoring period would otherwise allow. If the UE receives a DCI indicating that retransmission is required, the UE may retransmit the packet as well as an indication for a fast transmission request. This process may continue until an acknowledgement of the received packet is received in DL or no DCI indicating retransmission is received in DL. Accordingly, the gNB may quickly receive the retransmitted packet while the UE saves power by only performing additional monitoring when requested.

1 Claim, 6 Drawing Sheets

(51) Int. Cl.
*H04L 1/1829* (2023.01)
*H04L 1/1867* (2023.01)
*H04L 5/00* (2006.01)

(52) U.S. Cl.
CPC .......... *H04L 5/0053* (2013.01); *H04L 5/0091* (2013.01); *H04W 72/20* (2023.01)

(58) Field of Classification Search
CPC ... H04L 1/1812; H04L 1/1819; H04L 1/1816; H04L 1/189; H04L 1/1858
See application file for complete search history.

(56) References Cited

U.S. PATENT DOCUMENTS

| | | |
|---|---|---|
| 2020/0244528 A1 | 7/2020 | He et al. |
| 2020/0260508 A1* | 8/2020 | He .......................... H04W 4/70 |

\* cited by examiner

METHOD FOR FAST SCHEDULING OF RETRANSMISSION

CROSS REFERENCE TO RELATED APPLICATION

This patent application is a U.S. National Stage application of International Patent Application Number PCT/EP2021/075323 filed Sep. 15, 2021, which is hereby incorporated by reference in its entirety, and claims priority to IN 202041044276 filed Oct. 12, 2020.

BACKGROUND

Technical Field

The example and non-limiting embodiments relate generally to transmission of reports with low latency and high reliability.

Brief Description of Prior Developments

It is known, for a user equipment in communication with a network, to search for downlink communication at every slot or with discontinuous reception.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
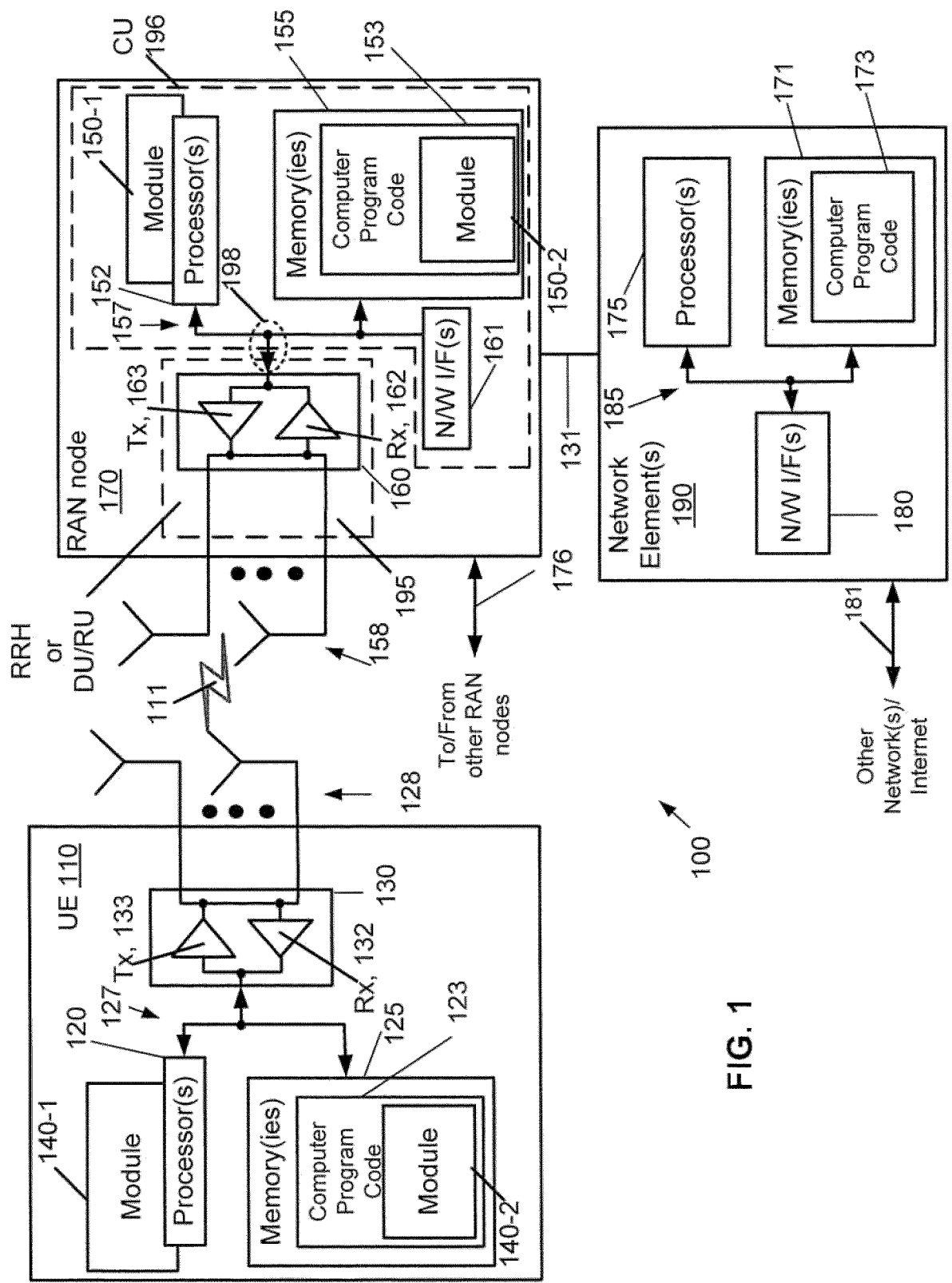
FIG. 1 is a block diagram of one possible and non-limiting exemplary system in which the exemplary embodiments may be practiced.

The following abbreviations that may be found in the specification and/or the drawing figures are defined as follows:

3 GPP third generation partnership project
5G fifth generation
5GC 5G core network
AL aggregation level
AMF access and mobility management function
BS base station
BSR buffer status report
BW bandwidth
BWP bandwidth part
CCE control channel element
CORESET common resource set
CU central unit
DCI downlink control information
DL downlink
DMRS demodulation reference signal
DRX discontinuous reception
DU distributed unit
eMBB ENHANCED MOBILE BROADBAND
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDD frequency division duplex
FR1 frequency range 1
FR2 frequency range 2
gNB (or gNodeB) base station for 5G/NR, i.e., a node providing NR user plane and control plane protocol terminations towards the UE, and connected via the NG interface to the 5GC
HARQ hybrid automatic repeat request
I/F interface
IoT Internet of things
L1 layer 1
LTE long term evolution
MAC medium access control
MIB master information block
MME mobility management entity
ng or NG new generation
ng-eNB or NG-eNB new generation eNB
NR new radio
N/W or NW network
PDCCH physical downlink control channel
PDCP packet data convergence protocol
PHY physical layer
PRB physical resource block
PUR reconfigured uplink resource
PUSCH physical uplink shared channel
QAM quadrature amplitude modulation
RACH random access channel
RAN radio access network
RedCap (or REDCAP) reduced capability
RF radio frequency
RLC radio link control
RNTI radio network temporary identifier
RS reference signal
RRH remote radio head
RRC radio resource control
RU radio unit
Rx receiver
SCS subcarrier spacing
SDAP service data adaptation protocol
SDT small data transfer/transmission
SGW serving gateway
SI-RNTI system information radio network temporary identifier
SIB system information block
SIB1 system information block type 1
SMF session management function
SR scheduling request
SRS sounding reference signal
SSB synchronized signal block
TTI transmission time interval
Tx transmitter
UE user equipment (e.g., a wireless, typically mobile device)
UL uplink
UPF user plane function
URLLC ultra-reliable, low-latency communication Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

Although not pictured, it should be understood that the UE 110 may comprise one or more sensors, or may be capable of receiving information from one or more sensors and processing the received information. Receiving information from one or more sensors may include receiving the information via short range (radio) communication or via network communication, as further discussed below.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions. Various embodiments of the user equipment 110 can also include sensors having wired or wireless communication capabilities, Internet of Things (IoT) devices, devices capable of receiving information from sensors and having wireless communication capabilities, etc.

Features as described herein generally relate to enabling UEs to send reports or messages with low latency and high reliability while providing power savings. For example, such features may be used to implement industrial wireless sensors that may require the potential to send messages, such as safety related reports, with low latency and high reliability while requiring or providing a battery life of, at least, a few years.

UEs enabled to send messages with low latency and high reliability may include reduced capability (RedCap) UEs, which may have reduced capabilities such as: bandwidth (BW) of 20 MHz for frequency range 1 (FR1), BW of 50 or 100 MHz for frequency range 2 (FR2), reduced number of antennas (e.g. 1 Tx antenna, 1 or 2 Rx antenna depending on FR and band), limited peak data rates, restricted modulation levels (e.g. 64 quadrature amplitude modulation (QAM) in downlink (DL) and 16-QAM in uplink (UL)) and/or optional half-duplex frequency division duplex (FDD).

Example embodiments of the present disclosure may comprise UEs with features consistent with Rel-17 System Information on Reduced Capability (RedCap) NR Devices (3GPP RP-193238). Use cases for RedCap UE and example embodiments of the present disclosure may include industrial Internet of Things (IoT) sensors, wearables, and/or devices used for transportation, tracking, infrastructure, agriculture, smart cities, etc. Wearables may include sensors in contact with or near skin, smart fabric, heart rate monitors, temperature monitors, etc.

In 3GPP Rel-17, Reduced capability (RedCap) UE will be introduced (RP-193238). In 3GPP RP-193238, the following intended use cases for RedCap UE were listed in Section 3:

Industrial wireless sensors: Communication service availability is 99.99% and end-to-end latency less than 100 ms. The reference bit rate is less than 2 Mbps (potentially asymmetric e.g. UL heavy traffic) for all use cases and the device is stationary. The battery should last at least few years. For safety related sensors, latency requirement is lower, 5-10 ms Video Surveillance: As described in TS 22.804, reference economic video bitrate would be 2-4 Mbps, latency <500 ms, reliability 99%-99.9%. High-end video e.g. for farming would require 7.5-25 Mbps. It is noted that traffic pattern is dominated by UL transmissions.

Wearables: Reference bitrate for smart wearable application can be 10-50 Mbps in DL and minimum 5 Mbps in UL and peak bit rate of the device higher, 150 Mbps for downlink and 50 Mbps for uplink. Battery of the device should last multiple days (up to 1-2 weeks).

An important use case for RedCap UE may be for industrial sensors. For this type of device, the battery life may last a few years, and end-to-end latency in connected mode may be less than 100 ms, which may make this type of device somewhat delay tolerant. To minimize power consumption and improve battery life, RedCap industrial sensors may be configured with a relatively infrequent physical downlink control channel (PDCCH) monitoring period (e.g. every 10-20 ms).

However, in some cases, industrial sensors may have safety-related reports (also known as exception reports) to send/transmit. For these reports, the latency requirement may be lower, such as 5-10 ms, and the reliability requirement may be 99.99%. As a result, when safety-related reporting may be needed or for delay-sensitive traffic, the PDCCH monitoring period may need to be frequent in order to minimize latency (e.g. every slot). Frequent PDCCH monitoring may be necessary because, if the report was not successfully decoded the first time, the gNB may need to be able to schedule HARQ retransmission quickly so that the sensor can retransmit the report and the gNB can receive retransmission in a timely manner.

Safety-related reports may be rare, and a good portion of the time, perhaps 90%, the reports may be successfully received in the first transmission. Accordingly, it may be generally unnecessary for the UE to monitor the PDCCH frequently. This unnecessary frequent monitoring may result in UE power consumption that may prohibit the UE from achieving a battery life of a few years, as required in 3GPP RP-193238. In an example embodiment of the present disclosure, a method may be provided where a UE may be configured with a relatively infrequent PDCCH monitoring period, but a gNB may be able to quickly schedule HARQ retransmission in case of safety-related reports, exception reports, and/or other urgent messages. In an example embodiment of the present disclosure, the PDCCH search space may be dynamically configured based on either a trigger/indication by the UE or by configuration.

In discontinuous reception (DRX), the ON duration of a UE may be automatically extended where there is on-going data transmission. In an example embodiment of the present disclosure, the UE may automatically stay awake longer due to packet transmission/reception, but the search space adaptation to a different search space (configuration) may be triggered based on other parameters (e.g. via sounding reference signal (SRS) or scheduling request (SR)). Additionally or alternatively, in an example embodiment of the present disclosure, the type of the packet to be transmitted with PUSCH (e.g. exception report vs normal traffic) may trigger adaptation of the search space and the duration for which the adapted search space is effective.

Uplink repetition/TTI(transmission time interval)-bundling with early termination may be considered a solution for enabling a UE to provide low latency, high reliability, and power savings. However, it may be costly to configure uplink repetition with early termination as the default when a majority of uplink reports are normal, not urgent and/or safety-related.

In an example embodiment, a UE may be configured with a relatively infrequent physical downlink control channel (PDCCH) monitoring period, which may enable power saving in the UE. In an example embodiment, a gNB may be able to quickly schedule hybrid automatic repeat request (HARQ) retransmission for the UE in case of safety-related reports or other very urgent/delay sensitive messages. However, it should be noted that scheduling HARQ retransmission may increase UE power consumption, which may result in the UE being unlikely to achieve a long battery life, such as a battery life of a few years as required in 3GPP RP-193238. To reduce power consumption, in an example embodiment, a gNB may configured a UE to monitor PDCCH every 5 slots instead of monitoring every slot. This search space adaptation will reduce UE power consumption related to PDCCH monitoring by 80%, which may significantly extend UE battery life. This search space adaptation may be used by the UE in response to a trigger, and may result in more frequency PDCCH monitoring than the UE would otherwise perform.

In an example embodiment, a UE may be configured for fast scheduling of retransmission (e.g. configured with another control channel configuration to monitor for retransmission). The information to support fast scheduling of retransmission may be signaled either via radio resource control (RRC) configuration (e.g. for UE in connected mode) or broadcast (for UE doing small data transfer/transmission (SDT) or 2-step random access channel (RACH) procedure).

In an example embodiment, after UE transmits a packet on the physical uplink shared channel (PUSCH) in slot n, the UE may check for and may receive a downlink control information (DCI) message scheduling the UE to perform retransmission in next slot (i.e., n+k). For example, the parameter k can be configured by the gNB to be, e.g., 1 slot or 2 slots. Additionally or alternatively, the time for checking the DCI may be extended to a time window rather than a specific slot. The UE may monitor slot n+k regardless of the configured physical downlink control channel (PDCCH) monitoring period of the UE. If the UE receives a DCI scheduling a retransmission in slot n+k, it may again check for DCI scheduling retransmission after transmitting in PUSCH. Note that the UE may perform retransmission based on an uplink scheduling grant included in a DCI received/detected in slot n+k. The UE may stop checking for DCI when it receives DCI indicating ACK (i.e. the message transmitted over PUSCH was received by, e.g., gNB), when it does not receive DCI for retransmission during the PDCCH monitoring period (i.e. slot n+k), or when a maximum number of retransmission attempts has been made/reached.

In an example embodiment, a PHY (physical layer) signal or indication may be transmitted at approximately the same time as, or added to, the UL transmission to let the gNB know that fast retransmission scheduling may be needed for the transmitted PUSCH packet. The UE may include such an indication when the message transmitted on PUSCH is a message that requires low latency and high reliability, such as safety-related reporting. Alternatively, the indication may be added or transmitted at a higher layer. In an alternative example embodiment, a UE may request and be configured via RRC to expect fast retransmission scheduling for every PUSCH packet, in which case this PHY signal or indication may not be needed. However, this may result in less power savings, as the UE may be configured to monitor for DCI for an indication that retransmission is required after each PUSCH transmission.

In an example embodiment, if the first transmission on PUSCH is allocated only to send BSR (Buffer Status Report), there may also be included a MAC level indication that fast scheduling is needed for the actual (future) PUSCH transmission. Accordingly, the UE may be configured to monitor for DCI for retransmission after the actual PUSCH transmission is made.

In an example embodiment, a UE may request, and be configured, via radio resource control (RRC) signaling, to expect/monitor for fast retransmission scheduling for/after every PUSCH packet, in which case an indication from the UE that fast retransmission scheduling may be needed for a specific UL packet may not be needed. In this example embodiment, limiting the PDCCH search space to certain DCI formats may not result in UE power saving, as the UE may still need to perform monitoring/blind decoding for every slot.

Figure 2:
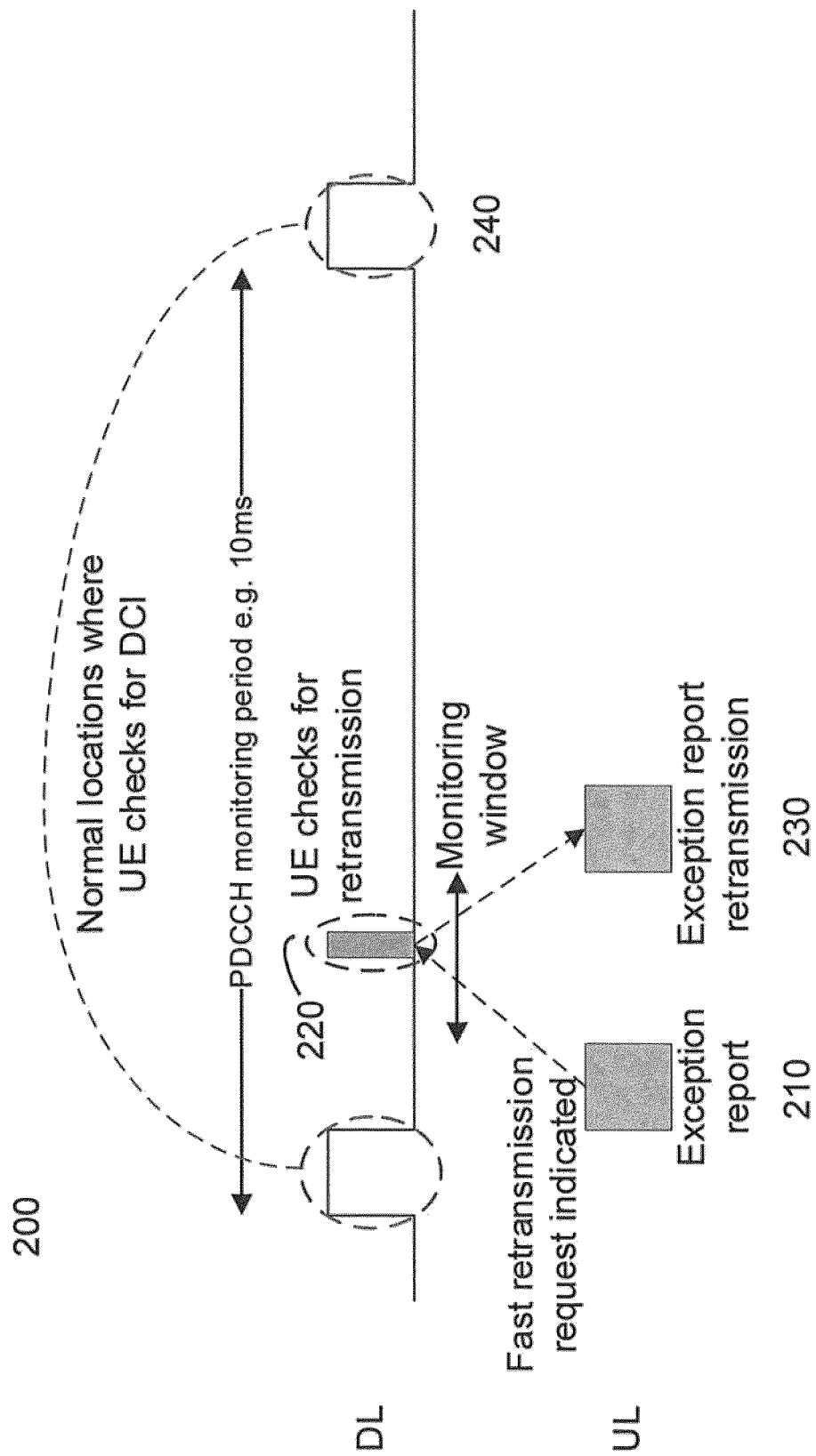
FIG. 2 is a diagram illustrating features as described herein.

Referring now to FIG. 2, illustrated is an example method 200 for a UE to check whether retransmission on PUSCH is necessary, for example by monitoring for a DCI using an adapted search space. The example method 200 may enable the UE to be configured with relatively infrequent PDCCH monitoring period in general, which may allow for power saving, but the gNB would still be able to quickly schedule HARQ retransmission in case of safety-related reports or other very urgent/delay-sensitive messages. At 210, the UE may transmit an exception report in UL in slot n. A PHY signal or indication may be added to the UL transmission to let the gNB know that fast retransmission scheduling may be needed for this PUSCH packet. For example, the UE may use different DMRS shift or transmit an SRS to indicate that fast retransmission scheduling may be needed. The gNB may determine, based on this indication, when to send DCI scheduling retransmission (if needed), i.e. what search space the UE will be monitoring. Alternatively, the UE may be configured with two different Scheduling Requests (SRs) where one SR may be used to indicate the need for fast scheduling for retransmission and the other SR may be used to indicate that fast scheduling for retransmission is unnecessary. If SR is used, the gNB may instead configure UL repetition with early termination. A connected mode UE may be configured with common SR resources with a similar frequency corresponding to fast transmission.

If fast retransmission is configured at the UE, after UE transmits a packet on the PUSCH in slot n, it will check for DCI scheduling retransmission in slot n+k in DL, at 220. It should be noted that the UE may be configured with a PDCCH period of, for example, 10 ms, but regardless of the configured PDCCH monitoring period, the UE may check for a DCI scheduling retransmission at 220 even though the UE is scheduled to next monitor PDCCH at 240. In other words, alteration of the search space of the UE may be triggered by the type of the UL packet transmitted. The gNB may transmit a DCI in slot n+k if, for example, the gNB cannot decode the UL packet transmitted by the UE in slot n. If the UE receives a DCI for retransmission at 220, the UE may retransmit the exception report at 230. The retransmitted exception report may also include an indication of a fast retransmission request. If the UE receives a DCI scheduling a retransmission in slot n+k (i.e. at 220), it may again check for DCI scheduling retransmission after retransmitting the PUSCH (i.e. after 230).

Figure 3:
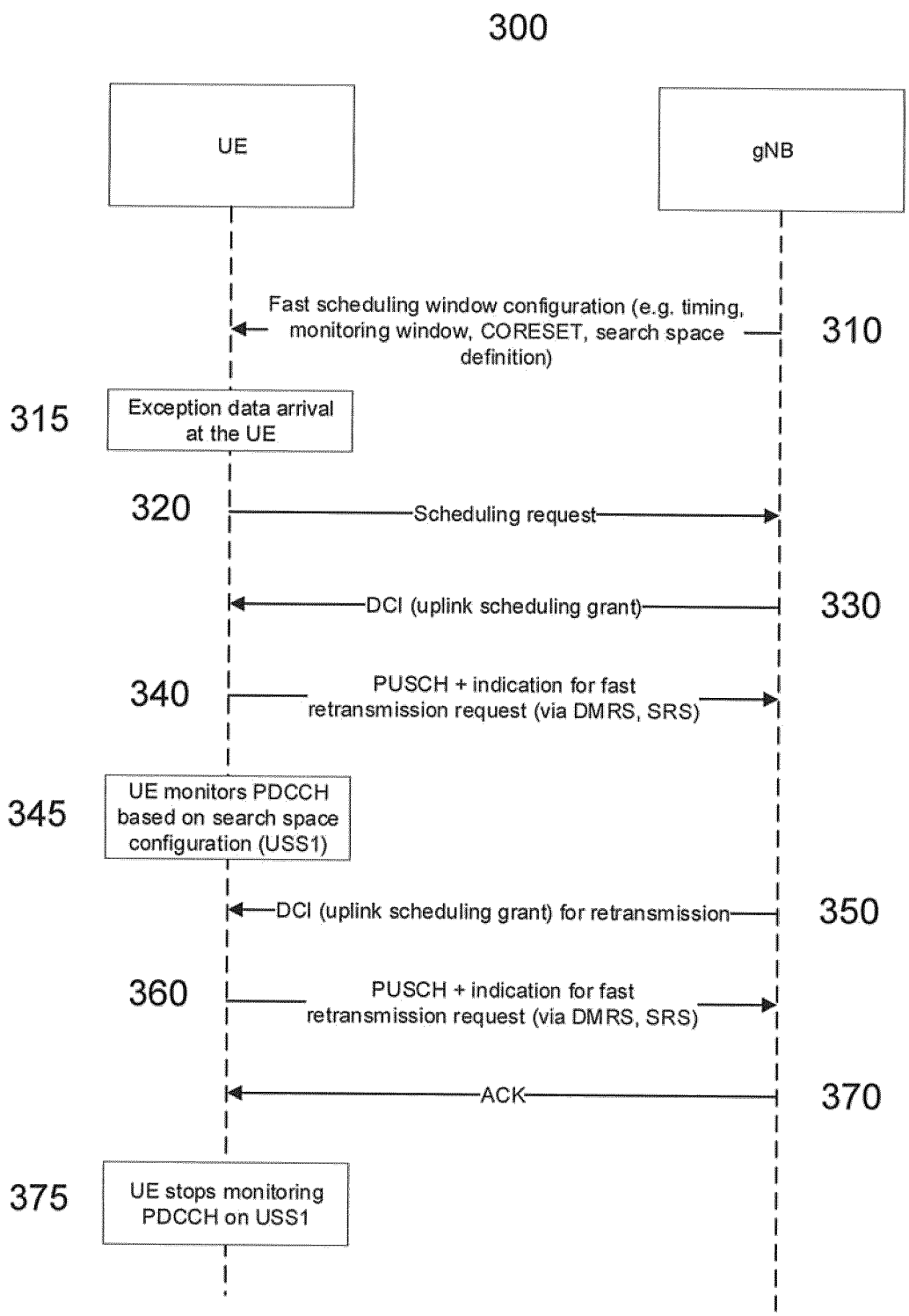
FIG. 3 is a diagram illustrating features as described herein.

Referring now to FIG. 3, illustrated is an example method 300 in which a UE may indicate the need for fast scheduling for retransmission in a message transmitted/sent over PUSCH. At 310, gNB may configure the UE with a fast scheduling window configuration (or control channel configuration). The configuration may include a timing definition, a monitoring window, a common resource set (CORESET), and/or a search space configuration. The fast scheduling window configuration may indicate the resources that the UE should monitor in order to detect DCI for retransmission. Additional/different parameters may be included in the fast scheduling window. Such information for supporting fast retransmission may be signaled to the UE either via RRC configuration (for UE in connected mode) or broadcast (for UE doing SDT or 2-step RACH). The fast scheduling window configuration may indicate/configure a parameter k, which may, for example, have a value of 1 slot or 2 slots. k may be signaled to the UE via higher-layer signaling, and may be used by the UE to determine a slot at which DCI for retransmission may be detected in DL. Additionally or alternatively, the gNB may indicate a time window during which DCI for retransmission may be detected, rather than a specific slot. Additionally or alternatively, a secondary search space window following the normal PDCCH window with a length of N subframes may be defined to allow network to have flexibility to schedule/transmit DCI for retransmission in n+k to n+k+N.

At 315, exception data may arrive at the UE. This may be data indicating that a safety hazard has occurred, or may be data that triggers transmission of an urgent/delay-sensitive message over PUSCH. In a non-limiting example, an industrial sensor may detect that a sensed/detected/measured temperature meets or exceeds a threshold value, and accordingly may determine that a safety-related report should be transmitted to an engineer, i.e. transmitted to an interested party over a network via PUSCH. Other scenarios in which a message for which retransmission may be necessary to provide low-latency may be clear to a person of ordinary skill in the art. At 320, the UE may transmit a scheduling request to gNB. At 330, the gNB may transmit a DCI to the UE, which may include an uplink scheduling grant. At 340, the UE may transmit a packet over PUSCH to gNB. This transmission may be made according to the received uplink scheduling grant. A PHY signal or indication may be added to the UL transmission to let the gNB know that fast retransmission scheduling may be needed for this PUSCH packet. For example, the UE may use different demodulation reference signal (DMRS) shift or transmit an SRS (e.g. by puncturing the last symbol of the PUSCH and transmitting an SRS in its place) to indicate that fast retransmission scheduling may be needed. Alternatively, an indication may be added or transmitted at a higher layer. The gNB may determine, based on this indication, when to send DCI scheduling retransmission (if needed).

UE may need to include differentiating information in this first grant (i.e. indication for fast retransmission request at 340) to identify the transmitting UE, similar to DMRS. If the gNB detects the UE based on DMRS but fails to decode the UL packet, the gNB may indicate the UE-ID in DCI for retransmission and other UE(s) may stop transmission/not perform retransmission in response.

It should be noted that a UE may request and be configured via RRC to expect fast retransmission scheduling for every PUSCH packet, in which case this indication is not needed at 340.

If fast retransmission is configured at the UE, after UE transmits a packet on the PUSCH in slot n (i.e. at 340), it will check for DCI scheduling retransmission in slot n+k (at 345) regardless of a configured PDCCH monitoring period of the UE. The monitoring of PDCCH at 345 may be based on a search space configuration (USS1) included in the fast scheduling window configuration. In an example embodiment, a UE can switch to monitoring a second search space ('fast search space') after the initial transmission and gNB can send the DCI with common radio network temporary identifier (RNTI) in the 'fast search space'. The second search space may have a more frequent monitoring period. The switch may be part of an RRC configuration.

At 350, the gNB may transmit DCI for retransmission. The DCI may indicate that retransmission of the packet triggered by the exception data is necessary. For example, the gNB may transmit the DCI if thee UL packet received at 340 cannot be decoded. The DCI may (optionally) include an uplink scheduling grant for the UE to retransmit the packet over PUSCH.

At 360, the UE may retransmit the packet over PUSCH. The PUSCH transmission may be scheduled by the DCI received at 350 (e.g. connected mode or Msg3), or may be preconfigured (i.e. grant-free) uplink transmission. The UE may include an indication for fast retransmission request, which may be transmitted via DMRS or SRS. Accordingly, the UE may again monitor PDCCH for DCI based on the fast scheduling window configuration. In the example 300, the UE may receive an acknowledgement of the PUSCH packet at 370. When the UE monitors PDCCH after transmitting an indication for fast retransmission request (e.g. at 345 and 370), the UE may receive/detect a DCI for retransmission, an acknowledgement, or no message during the configured fast scheduling window. While FIG. 3 illustrates two of these scenarios, it should be understood that the example embodiments of the present disclosure are not limited to a scenario in which a DCI for retransmission is received once and an acknowledgement is received once. For example, several successive DCI for retransmission may be detected, or no DCI for retransmission may be detected. In the example 300 of FIG. 3, after detecting the acknowledgement at 370, the UE may stop monitoring PDCCH on USS1 at 375. The UE may stop checking PDCCH either when it receives DCI indicating ACK, does not receive DCI for retransmission in the configured search space, or when a maximum number of retransmission attempts has been made/reached.

Figure 4:
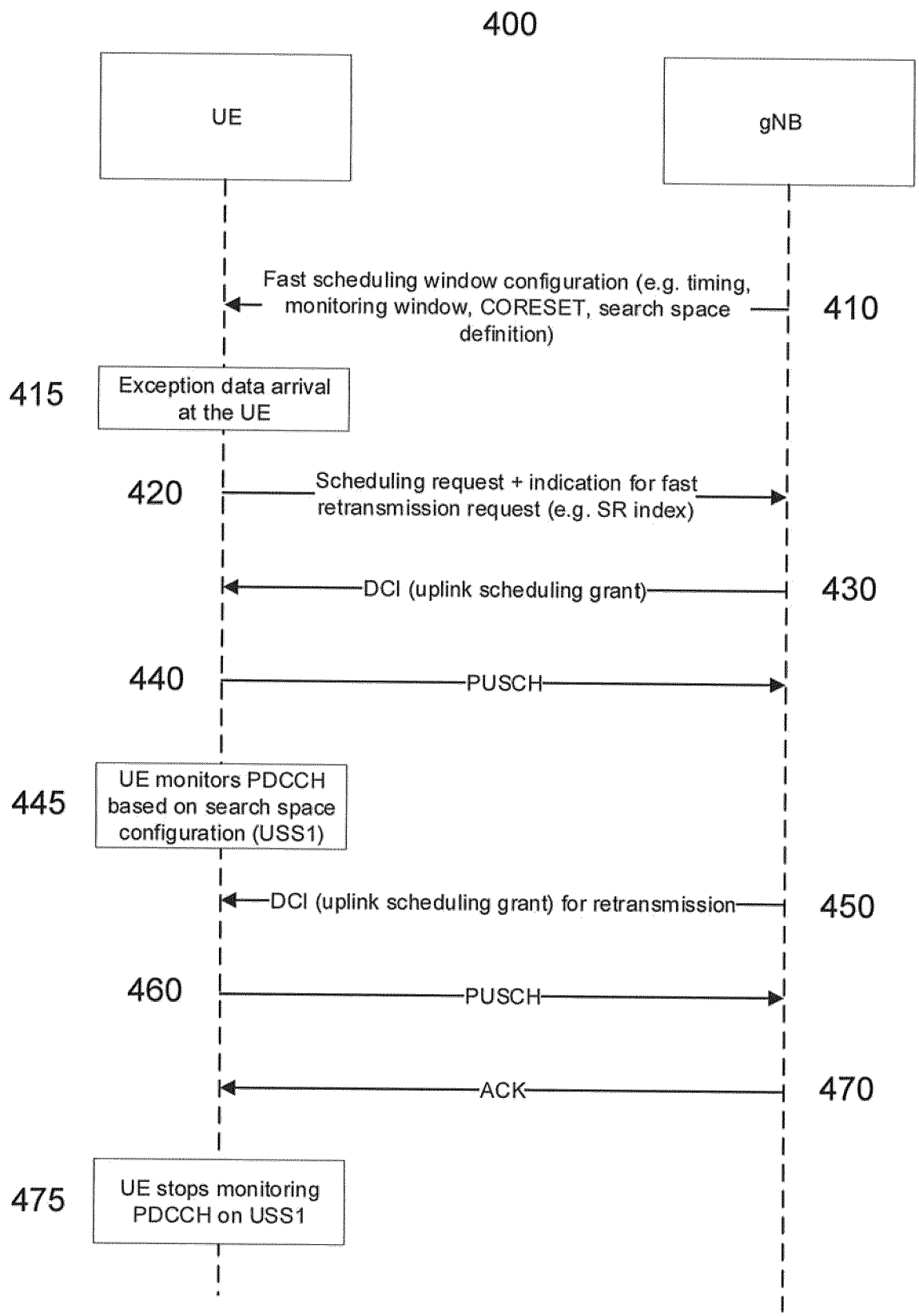
FIG. 4 is a diagram illustrating features as described herein.

Referring now to FIG. 4, illustrated is an alternative example method 400 in which a UE may indicate the need for fast scheduling for retransmission in a scheduling request (SR). In such a scenario, it may be implied that fast retransmission may be needed for any/all UL transmission (s). At 410, gNB may configure the UE with a fast scheduling window configuration (or control channel configuration). The configuration may include a timing definition, a monitoring window, a common resource set (CORESET), and/or a search space configuration. Additional/different parameters may be included in the fast scheduling window configuration. Such information for supporting fast retransmission may be signaled to the UE either via RRC configuration (for UE in connected mode) or broadcast (for UE doing SDT or 2-step RACH). At 415, exception data may arrive at the UE. This may be data indicating that a safety hazard has occurred, or may be data that triggers transmission of an urgent message over PUSCH. At 420, the UE may transmit a scheduling request to gNB. The UE may also transmit/include an indication for fast retransmission request, e.g. via SR index. The UE may be configured with two different Scheduling Requests (SRs) where one SR may be used to indicate the need for fast scheduling for retransmission and the other SR may be used to indicate that fast scheduling for retransmission is unnecessary. If SR is used, the gNB may instead configure UL repetition with early termination. A connected mode UE may be configured with common SR resources with a similar frequency corresponding to fast (re)transmission.

UE may need to include differentiating information in this first grant (i.e. indication for fast retransmission request at 420) to identify the transmitting UE, similar to DMRS. If the gNB detects the UE based on DMRS but fails to decode the UL packet, the gNB may indicate the UE-ID in DCI for retransmission and other UE(s) may stop transmission/not perform retransmission in response.

At 430, the gNB may transmit a DCI to the UE, which may include an uplink scheduling grant. At 440, the UE may transmit a packet over PUSCH to gNB. This transmission may be performed based on a received uplink scheduling grant.

If fast scheduling/retransmission is configured at the UE, after UE transmits a packet on the PUSCH in slot n (i.e. at 440), it will check for DCI scheduling retransmission in slot n+k (at 445) regardless of a configured PDCCH monitoring period of the UE. The monitoring of PDCCH at 445 may be based on a search space configuration (USS1) included in the fast scheduling window configuration. In an example embodiment, a UE can switch to monitoring a second search space ('fast search space') after the initial transmission and gNB can send the DCI with common radio network temporary identifier (RNTI) in the 'fast search space'. The second search space may have a more frequent monitoring period. The switch may be part of an RRC configuration.

At 450, the gNB may transmit DCI for retransmission. The DCI may indicate that retransmission of the packet triggered by the exception data is necessary. The gNB may transmit the DCI based on a determination that the UL packet received at 440 cannot be decoded. The DCI may (optionally) include an uplink scheduling grant for the UE to retransmit the packet over PUSCH. At 460, the UE may retransmit the packet over PUSCH. The PUSCH transmission may be scheduled by DCI received at 450 (e.g. connected mode or Msg3), or may be preconfigured (i.e. grant-free) uplink transmission. The UE may again monitor PDCCH for DCI based on the fast scheduling window configuration. At 470, the gNB may transmit in DL, and the UE may detect, an acknowledgement of the transmitted packet. In response, at 475, the UE may stop monitoring PCDDH on USS1. The UE may stop checking PDCCH either when it receives DCI indicating ACK, did not receive DCI for retransmission in the adapted search space, or when a maximum number of retransmission attempts have previously been made/reached.

In one example embodiment, a UE may also incorporate complexity reduction techniques such as reduced number of UE RX/TX antennas; UE bandwidth reduction (Rel-15 SSB bandwidth should be reused and L1 changes minimized); Half-Duplex-FDD; relaxed UE processing time; and/or relaxed UE processing capability.

Figure 5:
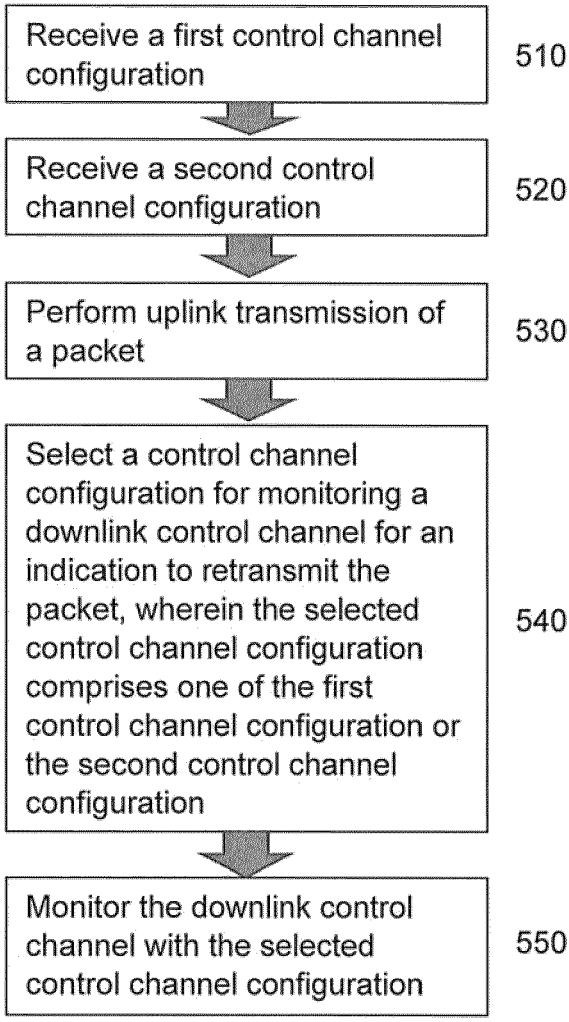
FIG. 5 is a flowchart illustrating steps as described herein.

FIG. 5 illustrates the potential steps of an example method 500. The example method 500 may include: receiving a first control channel configuration, 510; receiving a second control channel configuration, 520; performing uplink transmission of a packet, 530; selecting a control channel configuration for monitoring a downlink control channel for an indication to retransmit the packet, wherein the selected control channel configuration comprises one of the first control channel configuration or the second control channel configuration, 540; and monitoring the downlink control channel with the selected control channel configuration, 550. The example method 500 may be performed, for example, with or at a user equipment.

Figure 6:
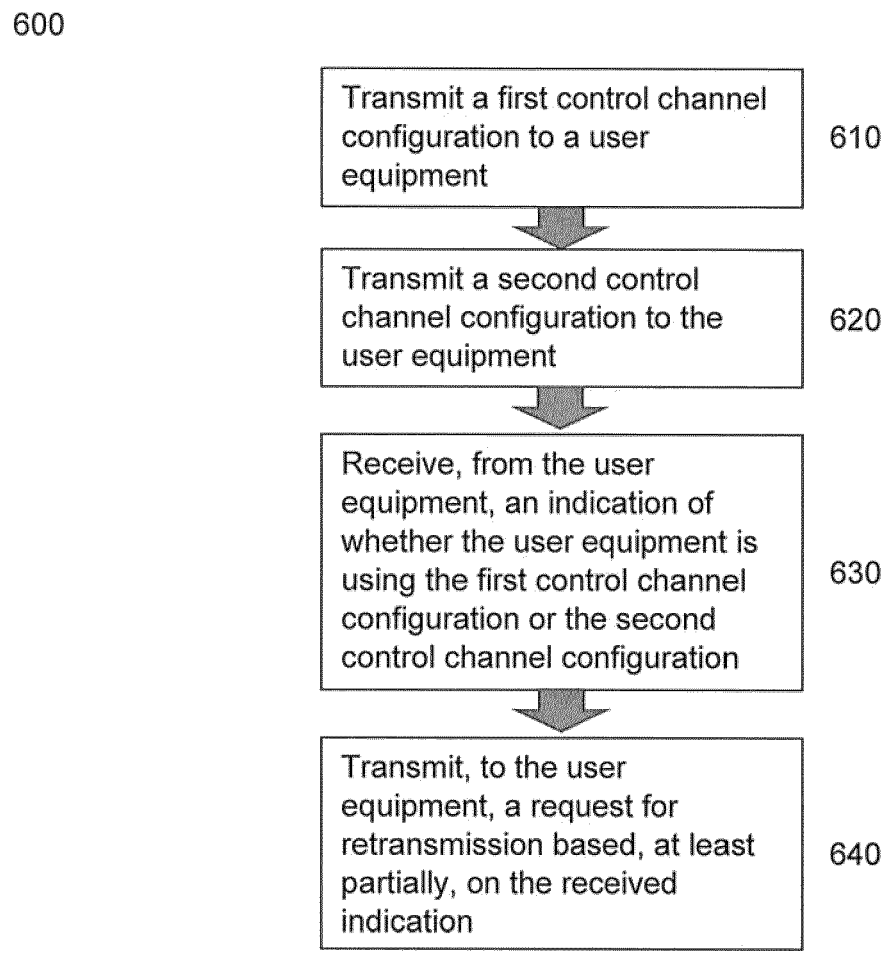
FIG. 6 is a flowchart illustrating steps as described herein.

FIG. 6 illustrates the potential steps of an example method 600. The example method 600 may include: transmitting, a first control channel configuration to a user equipment, 610; transmitting a second control channel configuration to the user equipment, 620; receiving, from the user equipment, an indication of whether the user equipment is using the first control channel configuration or the second control channel configuration, 630; and transmitting, to the user equipment, a request for retransmission based, at least partially, on the received indication, 640. The example method 600 may be performed, for example, with or at a base station.

In accordance with one aspect, an example method may be provided comprising: receiving, with a user equipment, a first control channel configuration; receiving, with the user equipment, a second control channel configuration; performing, with the user equipment, uplink transmission of a packet; selecting, with the user equipment, a control channel configuration for monitoring a downlink control channel for an indication to retransmit the packet, wherein the selected control channel configuration may comprise one of the first control channel configuration or the second control channel configuration; and monitoring, with the user equipment, the downlink control channel with the selected control channel configuration.

The example method may further comprise: based on the monitoring of the downlink control channel, detecting, with the user equipment, an indication to retransmit the packet; and based on the detecting of the indication to retransmit the packet, performing, with the user equipment, retransmission of the packet.

The performing of the uplink transmission of the packet may be performed based on the first control channel configuration.

The second control channel configuration may comprise a more frequent period for monitoring the downlink control channel than the first control channel configuration.

The example method may further comprise: signaling, with the user equipment, an indication of the selected control channel configuration, with at least one of: a physical layer signal, a radio resource control message, a medium access control message, an indication of a scheduling request index, a demodulation reference signal, or a sounding reference signal.

The example method may further comprise: ceasing monitoring of the downlink control channel based on at least one of: detecting an acknowledgment of the packet, not detecting an indication to retransmit the packet, or reaching a maximum number of retransmission attempts.

The indication to retransmit the packet may comprise a downlink control information message, wherein the downlink control information message may comprise an uplink scheduling grant, wherein the example method may further comprise: performing retransmission of the packet based, at least partially, on the uplink scheduling grant.

The second control channel configuration may comprise at least one of: a timing definition, a monitoring window, a slot offset value, a common resource set, or a search space configuration for monitoring the downlink control channel.

The selecting of the control channel configuration for monitoring the downlink control channel for an indication to retransmit the packet may be based, at least partially, on a determination that the packet comprises at least one of: exception data, data required to be transmitted with low latency and high reliability, or delay-sensitive data.

The receiving of the second control channel configuration may comprise receiving the second control channel configuration with at least one of: radio resource control signaling, or broadcast signaling.

In accordance with one example embodiment, an apparatus may comprise: at least one processor; and at least one memory including computer program code; the at least one memory and the computer program code configured to, with the at least one processor, cause the apparatus to: receive a first control channel configuration; receive a second control channel configuration; perform uplink transmission of a packet; select a control channel configuration for monitoring a downlink control channel for an indication to retransmit the packet, wherein the selected control channel configuration may comprise one of the first control channel configuration or the second control channel configuration; and monitor the downlink control channel with the selected control channel configuration.

The example apparatus may be further configured to: based on monitoring the downlink control channel, detect an indication to retransmit the packet; and based on detecting the indication to retransmit the packet, perform retransmission of the packet.

The example apparatus may be further configured to: perform the uplink transmission of the packet based on the first control channel configuration.

The second control channel configuration may comprise a more frequent period for monitoring the downlink control channel than the first control channel configuration.

The example apparatus may be further configured to: signal an indication of the selected control channel configuration with at least one of: a physical layer signal, a radio resource control message, a medium access control message, an indication of a scheduling request index, a demodulation reference signal, or a sounding reference signal.

The example apparatus may be further configured to: cease monitoring of the downlink control channel based on at least one of: detecting an acknowledgment of the packet, not detecting an indication to retransmit the packet, or reaching a maximum number of retransmission attempts.

The indication to retransmit the packet may comprise a downlink control information message, wherein the downlink control information message may comprise an uplink scheduling grant, wherein the example apparatus may be further configured to: perform retransmission of the packet based, at least partially, on the uplink scheduling grant.

The second control channel configuration may comprise at least one of: a timing definition, a monitoring window, a slot offset value, a common resource set, or a search space configuration for monitoring the downlink control channel.

Selecting the control channel configuration for monitoring the downlink control channel for an indication to retransmit the packet may be based, at least partially, on a determination that the packet comprises at least one of: exception data, data required to be transmitted with low latency and high reliability, or delay-sensitive data.

Receiving the second control channel configuration may comprise the example apparatus may be further configured to: receive the second control channel configuration with at least one of: radio resource control signaling, or broadcast signaling.

In accordance with one example embodiment, an apparatus may comprise: circuitry configured to perform receiving, with a user equipment, a first control channel configuration; receiving, with the user equipment, a second control channel configuration; performing, with the user equipment, uplink transmission of a packet; selecting, with the user equipment, a control channel configuration for monitoring a downlink control channel for an indication to retransmit the packet, wherein the selected control channel configuration may comprise one of the first control channel configuration or the second control channel configuration; and monitoring, with the user equipment, the downlink control channel with the selected control channel configuration.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: receiving a first control channel configuration; receiving a second control channel configuration; performing uplink transmission of a packet; selecting a control channel configuration for monitoring a downlink control channel for an indication to retransmit the packet, wherein the selected control channel configuration may comprise one of the first control channel configuration or the second control channel configuration; and monitoring the downlink control channel with the selected control channel configuration.

In accordance with one example embodiment, a non-transitory computer-readable medium comprising program instructions stored thereon which, when executed with at least one processor, cause the at least one processor to: receive a first control channel configuration; receive a second control channel configuration; perform uplink transmission of a packet; select a control channel configuration for monitoring a downlink control channel for an indication to retransmit the packet, wherein the selected control channel configuration comprises one of the first control channel configuration or the second control channel configuration; and monitor the downlink control channel with the selected control channel configuration.

In accordance with one aspect, an example method may be provided comprising: transmitting, with a base station, a first control channel configuration to a user equipment; transmitting, with the base station, a second control channel configuration to the user equipment; receiving, from the user equipment, an indication of whether the user equipment is using the first control channel configuration or the second control channel configuration; and transmitting, with the base station to the user equipment, a request for retransmission based, at least partially, on the received indication.

The example method may further comprise: receiving, from the user equipment, a packet; and transmitting, to the user equipment, an acknowledgement of the packet.

The second control channel configuration may comprise a more frequent period for monitoring the downlink control channel than the first control channel configuration.

The receiving of the indication of whether the user equipment is using the first control channel configuration or the second control channel configuration may comprise receiving at least one of: a physical layer signal, a radio resource control message, a medium access control message, an indication of a scheduling request index, a demodulation reference signal, or a sounding reference signal.

The request for retransmission may comprise a downlink control information message, wherein the downlink control information message may comprise an uplink scheduling grant, wherein the example method may further comprise: monitoring the one or more resources included in the uplink scheduling grant for a packet from the user equipment.

The second control channel configuration may comprise at least one of: a timing definition, a monitoring window, a slot offset value, a common resource set, or a search space configuration for the user equipment to monitor the downlink control channel.

At least one of the first control channel configuration or the second control channel configuration may be transmitted with at least one of: radio resource control signaling, or broadcast signaling.

The transmitting of the request for retransmission may be further based on receiving a packet from the user equipment that cannot be decoded.

The indication of whether the user equipment is using the first control channel configuration or the second control channel configuration may further comprise an identifier of the user equipment, wherein the request for retransmission may comprise the identifier of the user equipment.

In accordance with one example embodiment, an apparatus may comprise: at least one processor; and at least one memory including computer program code; the at least one memory and the computer program code configured to, with the at least one processor, cause the apparatus to: transmit a first control channel configuration to a user equipment; transmit a second control channel configuration to the user equipment; receive, from the user equipment, an indication of whether the user equipment is using the first control channel configuration or the second control channel configuration; and transmit, to the user equipment, a request for retransmission based, at least partially, on the received indication.

The example apparatus may be further configured to: receive, from the user equipment, a packet; and transmit, to the user equipment, an acknowledgement of the packet.

The second control channel configuration may comprise a more frequent period for monitoring the downlink control channel than the first control channel configuration.

Receiving the indication of whether the user equipment is using the first control channel configuration or the second control channel configuration, wherein the example apparatus may be further configured to: receive at least one of: a physical layer signal, a radio resource control message, a medium access control message, an indication of a scheduling request index, a demodulation reference signal, or a sounding reference signal.

The request for retransmission may comprise a downlink control information message, wherein the downlink control information message may comprise an uplink scheduling grant, wherein the example apparatus may be further configured to: monitor the one or more resources included in the uplink scheduling grant for a packet from the user equipment.

The second control channel configuration may comprise at least one of: a timing definition, a monitoring window, a slot offset value, a common resource set, or a search space configuration for the user equipment to monitor the downlink control channel.

At least one of the first control channel configuration or the second control channel configuration may be transmitted with at least one of: radio resource control signaling, or broadcast signaling.

Transmitting the request for retransmission may be further based on receiving a packet from the user equipment that cannot be decoded.

The indication of whether the user equipment is using the first control channel configuration or the second control channel configuration may further comprise an identifier of the user equipment, wherein the request for retransmission may comprise the identifier of the user equipment.

In accordance with one example embodiment, an apparatus may comprise: circuitry configured to perform transmitting, with a base station, a first control channel configuration to a user equipment; transmitting, with the base station, a second control channel configuration to the user equipment; receiving, from the user equipment, an indication of whether the user equipment is using the first control channel configuration or the second control channel configuration; and transmitting, with the base station to the user equipment, a request for retransmission based, at least partially, on the received indication.

In accordance with one example embodiment, an apparatus may comprise means for performing: transmitting a first control channel configuration to a user equipment; transmitting a second control channel configuration to the user equipment; receiving, from the user equipment, an indication of whether the user equipment is using the first control channel configuration or the second control channel configuration; and transmitting, to the user equipment, a request for retransmission based, at least partially, on the received indication.

In accordance with one example embodiment, a non-transitory computer-readable medium comprising program instructions stored thereon which, when executed with at least one processor, cause the at least one processor to: transmit a first control channel configuration to a user equipment; transmit a second control channel configuration to the user equipment; receive, from the user equipment, an indication of whether the user equipment is using the first control channel configuration or the second control channel configuration; and transmit, to the user equipment, a request for retransmission based, at least partially, on the received indication.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus, comprising:
   at least one processor; and
   at least one non-transitory memory storing instructions that, when executed with the at least one processor, cause the apparatus to:
   receive a first control channel configuration;
   receive a second control channel configuration with radio resource control signaling and broadcast signaling, wherein the second control channel configuration comprises a more frequent period for monitoring a downlink control channel than the first control channel configuration, and wherein the second control channel configuration further comprises, for monitoring the downlink control channel:
   a timing definition,
   a monitoring window,
   a slot offset value,
   a common resource set, and
   a search space configuration;
   perform uplink transmission of a packet based on the first control channel configuration;
   select a control channel configuration for monitoring the downlink control channel for an indication to retransmit the packet, wherein the selected control channel configuration comprises one of the first control channel configuration or the second control channel configuration, and wherein the selection of the control channel configuration is based, at least partially, on a determination that the packet comprises:
   exception data,
   data required to be transmitted with low latency and high reliability, and
   delay-sensitive data;
   signal an indication of the selected control channel configuration with:
   a physical layer signal,
   a radio resource control message,
   a medium access control message,
   an indication of a scheduling request index,
   a demodulation reference signal, and
   a sounding reference signal;
   monitor the downlink control channel with the selected control channel configuration;
   based on monitoring the downlink control channel, detect an indication to retransmit the packet, wherein the indication to retransmit the packet comprises a downlink control information message, and wherein the downlink control information message comprises an uplink scheduling grant;
   based on detecting the indication to retransmit the packet, perform retransmission of the packet based, at least partially, on the uplink scheduling grant; and
   cease monitoring of the downlink control channel based on:
   detecting an acknowledgment of the packet,
   not detecting an indication to retransmit the packet, and
   reaching a maximum number of retransmission attempts.

\* \* \* \* \*